United States Patent
Mozer (10) Patent No.: US 8,645,143 B2
(45) Date of Patent: Feb. 4, 2014

(54) SYSTEMS AND METHODS OF PERFORMING SPEECH RECOGNITION USING GLOBAL POSITIONING (GPS) INFORMATION

(75) Inventor: Todd F. Mozer, Los Altos Hills, CA (US)

(73) Assignee: Sensory, Inc., Sunnyvale, CA (US)

( * ) Notice: Subject to any disclaimer, the term of this patent is extended or adjusted under 35 U.S.C. 154(b) by 1335 days.

(21) Appl. No.: 11/799,172

(22) Filed: May 1, 2007

(65) Prior Publication Data

US 2008/0275699 A1 Nov. 6, 2008

(51) Int. Cl.
*G10L 21/00* (2013.01)
*G10L 25/00* (2013.01)

(52) U.S. Cl.
USPC .......... 704/275; 704/270; 701/408; 701/409; 701/412; 701/418

(58) Field of Classification Search
None
See application file for complete search history.

(56) References Cited

U.S. PATENT DOCUMENTS

| | | | |
|---|---|---|---|
| 4,506,378 A | 3/1985 | Noso et al. | |
| 5,524,169 A * | 6/1996 | Cohen et al. | 704/231 |
| 6,112,174 A * | 8/2000 | Wakisaka et al. | 704/251 |
| 6,490,521 B2 * | 12/2002 | Wiener | 701/211 |
| 6,598,018 B1 * | 7/2003 | Junqua | 704/251 |
| 6,678,612 B1 * | 1/2004 | Khawam | 701/213 |
| 6,732,077 B1 * | 5/2004 | Gilbert et al. | 704/270 |
| 6,904,362 B2 * | 6/2005 | Nakashima et al. | 701/421 |
| 7,505,907 B2 * | 3/2009 | Carro | 704/270.1 |
| 7,818,171 B2 * | 10/2010 | Hitotsumatsu et al. | 704/252 |
| 2003/0125869 A1 * | 7/2003 | Adams, Jr. | 701/200 |
| 2004/0059575 A1 * | 3/2004 | Brookes et al. | 704/254 |
| 2004/0215458 A1 * | 10/2004 | Kobayashi et al. | 704/251 |
| 2005/0080632 A1 * | 4/2005 | Endo et al. | 704/277 |
| 2005/0171685 A1 * | 8/2005 | Leung et al. | 701/200 |
| 2005/0234723 A1 | 10/2005 | Arnold et al. | |
| 2006/0143007 A1 | 6/2006 | Koh et al. | |
| 2006/0161440 A1 * | 7/2006 | Nakayama et al. | 704/270 |
| 2007/0219708 A1 * | 9/2007 | Brasche et al. | 701/207 |
| 2007/0233485 A1 * | 10/2007 | Hitotsumatsu et al. | 704/251 |
| 2008/0154876 A1 * | 6/2008 | Hao | 707/5 |
| 2010/0100559 A1 * | 4/2010 | Washio | 707/768 |

\* cited by examiner

*Primary Examiner* — Douglas Godbold
*Assistant Examiner* — Michael Ortiz Sanchez
(74) *Attorney, Agent, or Firm* — Fountainhead Law Group, PC (57) ABSTRACT

Embodiments of the present invention improve content selection systems and methods using speech recognition. In one embodiment, the present invention includes a speech recognition method comprising receiving location parameters from a global positioning system, retrieving location data using the location parameters, and configuring one or more recognition sets of a speech recognizer using the location data.

15 Claims, 7 Drawing Sheets

SYSTEMS AND METHODS OF PERFORMING SPEECH RECOGNITION USING GLOBAL POSITIONING (GPS) INFORMATION

BACKGROUND

The present invention relates to speech recognition, and more particularly, to systems and methods of performing speech recognition using location information.

GPS (Global Positioning Satellite) Systems have become more readily available to the public in automobiles and in hand held devices. Also mobile internet connectivity and increased data storage have allowed for a wealth of information to become available to people during their daily travels. GPS systems allow people to navigate their way through unfamiliar locations and find food, shelter, and fuel along the routes that they travel. Current GPS systems require input using simple menus and type written entry to find a desired destination. While driving or rushing through a busy street, the task of locating a destination may require a person to halt their travels and type in the information for their desired destination and furthermore this cumbersome activity may not take into account all the information available to the GPS device. This may cause delays in the person's travels and may require a great deal of unnecessary human user interaction with the mobile GPS device.

The present invention solves these and other problems with improved content selection systems and methods using speech recognition.

SUMMARY

Embodiments of the present invention improve content selection systems and methods using speech recognition. In one embodiment, the present invention includes a speech recognition method comprising receiving location parameters from a global positioning system, retrieving location data using the location parameters, and configuring one or more recognition sets of a speech recognizer using the location data.

In one embodiment, the method further comprises automatically reconfiguring the one or more recognition sets if the location parameters change.

In one embodiment, the recognition sets are reconfigured if the location parameters change by a predetermined amount.

In one embodiment, the location parameters comprise a position, and wherein the one or more recognition sets are reconfigured if the position changes a predetermined amount.

In one embodiment, the location data is retrieved based on speed, direction, or position.

In one embodiment, the method further comprises receiving a speech input signal and processing the speech input signal using the one or more recognition sets of said speech recognizer.

In one embodiment, the method further comprises determining one or more destinations based on a recognition result.

In one embodiment, the method further comprises accessing destinations based on a recognition result and said location parameters.

In one embodiment, the method further comprises generating a plurality of recognition results and weighting said recognition results based on said location parameters.

In one embodiment, the method further comprises activating a guidance program in response to the speech input signal and outputting guidance information.

In one embodiment, the location data comprises a plurality of names of restaurants, and wherein the names of the restaurants are configured in the one or more recognitions sets.

In one embodiment, the location data comprises a plurality of names of gas stations, and wherein the names of the gas stations are configured in the one or more recognitions sets.

In one embodiment, the location data comprises a plurality of street names, and wherein the street names are configured in the one or more recognitions sets.

In one embodiment, the location data comprises a plurality of names, and wherein the names are configured in the one or more recognitions sets.

The following detailed description and accompanying drawings provide a better understanding of the nature and advantages of the present invention.

DETAILED DESCRIPTION

Described herein are techniques for a content selection systems and methods using speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
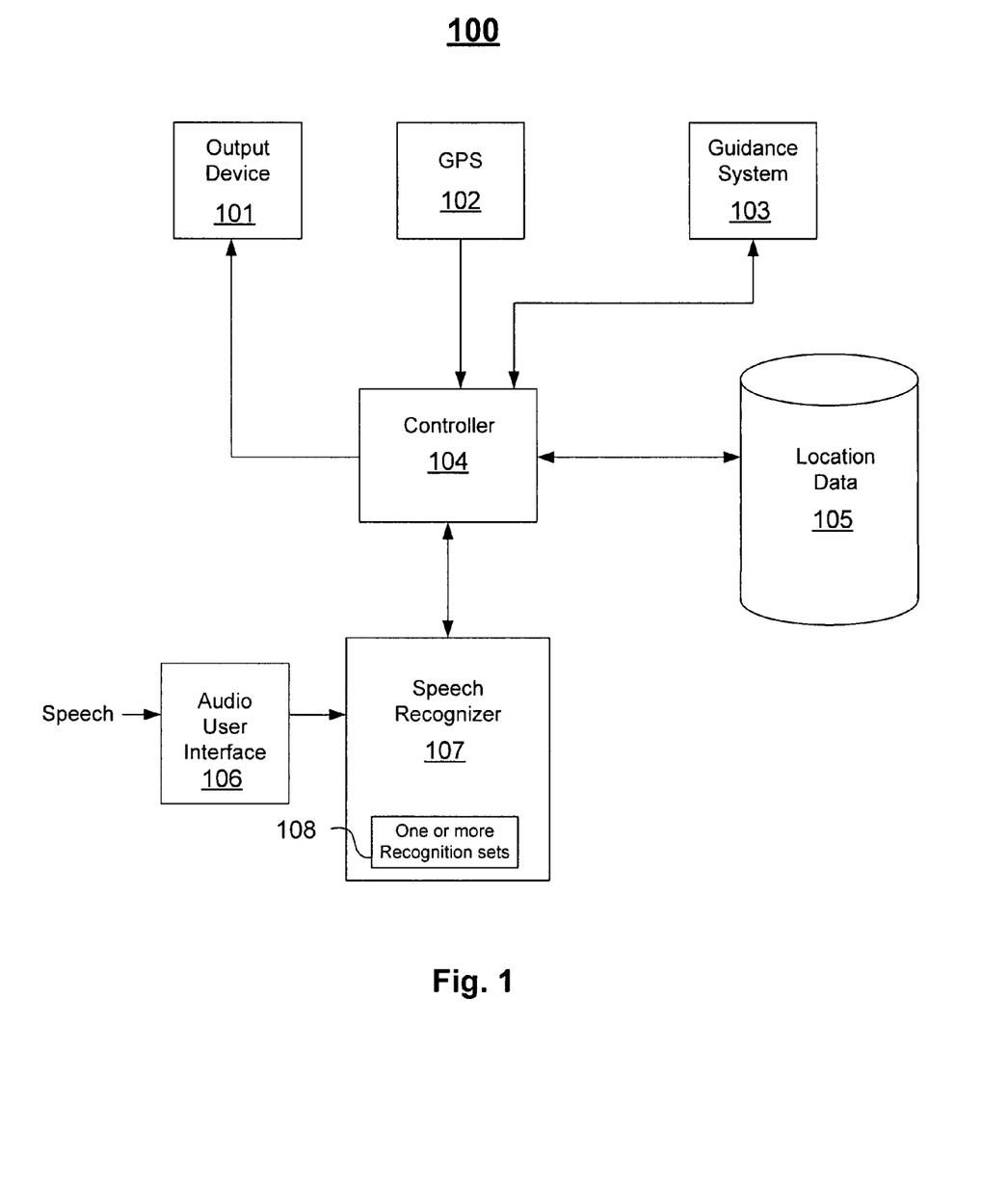
FIG. 1 illustrates a system for performing speech recognition using location information according to one embodiment of the present invention.

FIG. 1 illustrates a system for performing speech recognition using location information according to one embodiment of the present invention. System 100 includes a Global positioning system ("GPS") 102 and may receive signals from satellites and generate "location parameters" such as position, velocity (i.e., speed and direction of travel), and altitude, for example. The location parameters may be forwarded to a controller 104 and used to retrieve location data 105. Location data 105 may include streets, highways, roads, cities, towns, restaurants, gas stations, addresses, or a variety of other information about the location of people or things. Location data may include common names such as "gas station", "restaurant", or "library" which pertain to a particular class of destinations. Furthermore, the location data may include destination names that may be associated to particular classes. For example, the name "Denny's" may be associated with the class "restaurant". The controller 104 may retrieve location data 105 from a local storage medium such as a local memory, a hard disk drive, a non-volatile memory card, a CD, or a DVD. Alternatively, the controller may retrieve the location data from across a network such as a local area network, wide area network, a wireless network, or even the Internet. The controller may use the location parameters to perform a query to retrieve different types of location data. For example, the controller may use position parameters to retrieve all restaurants or gas stations, or both, within a certain area of the current position. Alternatively, the controller may use position parameters to retrieve all streets and cities within a certain area. Any location information may be retrieved based on the location parameters received from the GPS.

The location information is used to configure one or more recognition sets 108 in a speech recognizer 107. Accordingly, location data such as the names of streets, cities, restaurants, or gas stations, for example, may be configured into one or more recognition sets 108 based on the location parameters received by the system. In one embodiment, the system may use a displayed scale value to reconfigure the recognition sets. For example, if a user of the GPS system programs the system to display a map with a scale of 1 mile, then the system may use the current position and scale value to access location data. The location data retrieved may be limited based on the scale (e.g., for a scale of 400 yards, only location data within 1 mile may be retrieved). One or more recognition sets may be configured using the retrieved location data. However, if the scale on the map is changed, the recognition set may automatically be updated with new location data based on the new scale value. Additionally, in another embodiment, as the GPS location parameters change the corresponding location data changes. Accordingly, changes in the location parameters may cause the one or more recognition sets in the speech recognizer to be reconfigured automatically to recognize different speech inputs. For example, the system may reconfigure one or more recognition sets if the position changes by some predetermine value (e.g., change the recognition sets if the position changes by 1 mile, or change the recognition set if the position changes by 10 miles). Based on a scale of 1 mile, the system may retrieve new location data and reconfigure the recognition sets if the position changes by 100 yards, for example. However, if a scale value of 10 miles is used, then the system may retrieve new location data and reconfigure the recognition sets if the position changes by 1 mile.

System 100 also includes an audio user interface 106 and an output device 101. A speech input signal may be received and processed using the one or more recognition sets of the speech recognizer. The audio user interface receives the speech input from a user and may include a microphone, amplifier, and analog to digital converter (ADC) which may be used to translate the voice of the user into digital signals which the recognizer 107 may readily process. The user input may include a destination. For example, the user may wish to find a convenient gas station in order to refuel his car. The utterances "find gas station" would be converted to an appropriate signal by the audio user interface 106, and then passed to the recognizer 107 which would utilize the current recognition set 108 to recognize the class "gas station" as destination information. The recognizer may send a signal regarding the destination information to the controller 104, and then the controller may pass the location and destination information to a guidance system 103 to find the best route from the current position to the nearest gas station. The route information may be passed to an output device 101 so that a user may understand how to navigate to their destination. An example output device may be an audio system which may include some memory, a Digital to Analog Converter (DAC), an audio amplifier, and a speaker. The memory may include predefined user instructions such as "turn left", "turn right", "proceed" and "turn around" for example. In one embodiment, a guidance system is activated in response to the speech input signal and outputs guidance information to the user. In this embodiment, the controller, the output device, and the GPS may convey the navigation (guidance) information verbally with instructions to the driver. For example, the controller may instruct the output device to output "make a left at next intersection". After the user has made the left turn the location data can be updated to reflect the turn has been completed and the controller can instruct the output device to output "continue 1 mile". As the user approaches the destination the location information may be continuously updated and the corresponding message coming from the output device may be updated to say "continue one half mile more", and then "approaching destination". An output device may also be a visual output device which gives visual cues to the driver with a display, for example.

Figure 2:
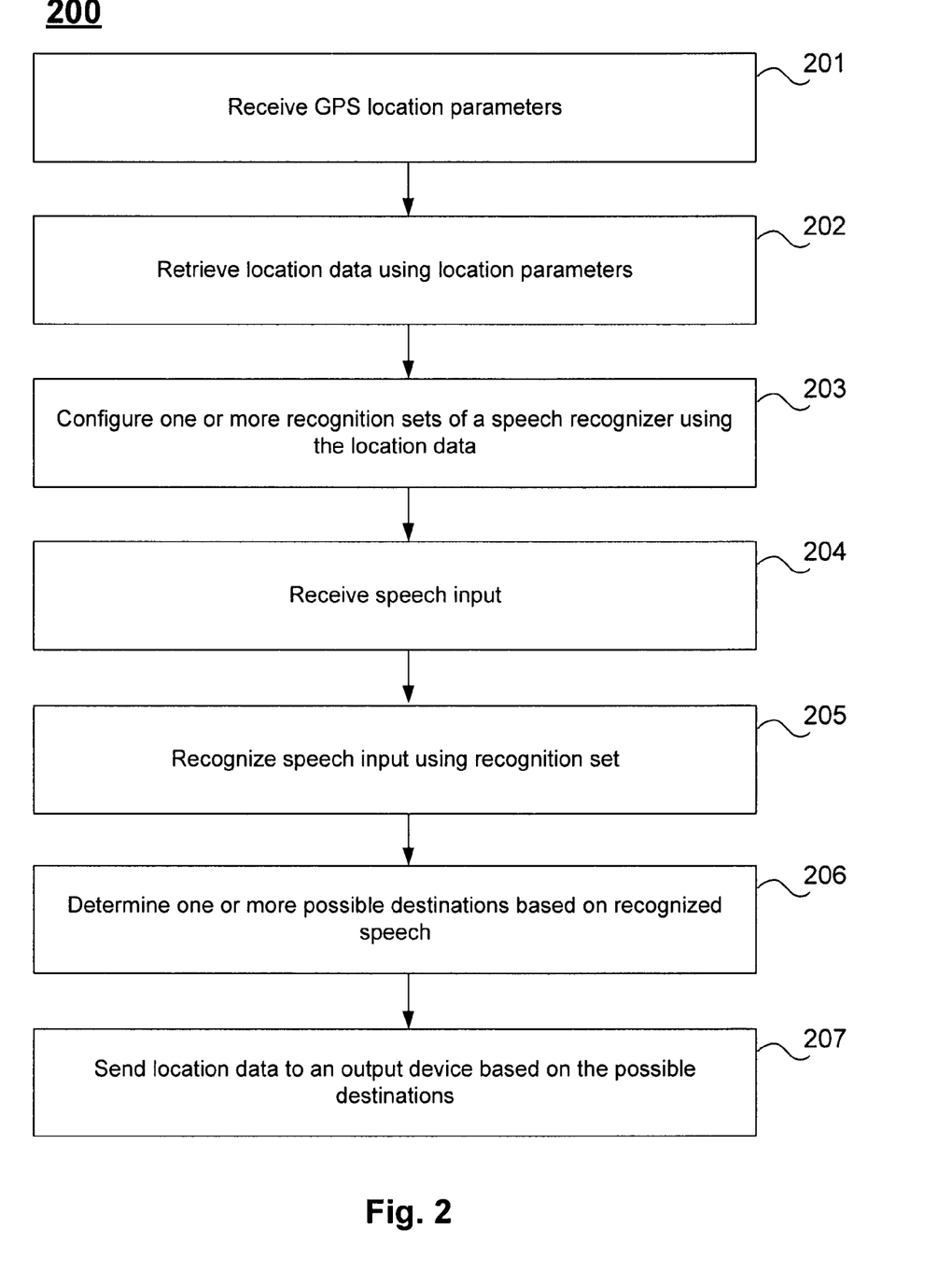
FIG. 2 illustrates a method for performing speech recognition using location information according to one embodiment of the present invention.

FIG. 2 illustrates a method for performing speech recognition using location information according to one embodiment of the present invention. At 201, the system receives GPS location parameters. As mentioned above, these parameters may include position, speed, direction, and altitude. At 202, location data is retrieved using the location parameters. The location data may comprise a plurality of destinations associated with a plurality of destination characteristics, wherein the characteristics may be used to limit the scope of destinations considered relevant. For example, the user may only have a Shell gas card so that he is only interested in destinations which honor the use of this gas credit card. Also, the user may only want gas stations which carry diesel fuel and for this characteristic the scope of content may be limited as well, for example. Also as mentioned above, the location data can be on a wide variety of media. At 203, the recognition sets of the speech recognizer are configured using the location data. The name of a street, city, restaurant, or class (e.g., gas stations, restaurants, store types, etc. . . . ) are examples of possible location data. In one embodiment, the speech recognizer may be reconfigured or updated based on scale and location change. For example, if the scale is small, a small change in location may trigger an update of the recognition set more frequently. At 204, speech input is received. As mentioned above, the speech may be inputted via a microphone, amplifier, and an ADC in order to translate the audio message into a digital format. At 205 the speech input is recognized using the recognition set. At 206, one or more possible destinations are generated based on the recognized speech. The destinations may be a list of possible destinations which fall into a specific class such as restaurant or gas station. For example, if the user has requested a place to dine, the possible destinations may be a list of all restaurants in the local area. In one embodiment, the destinations may include proper names and their associated likelihoods of matching the speech input. At 207, location data is sent to an output device based on the possible destinations. This location data may be a list of the top three possible destinations, a map of the surrounding local of the desired destination, directions to the one or more possible destinations, instructions to get to the destination, or information about the destination, for example. As mentioned above, the output device may include an audio, a video, or an audio and video output which may communicate the location data. Also, the output device may be a vehicle equipped to accept signals that automatically guide the vehicle to the desired destination.

Figure 3A:
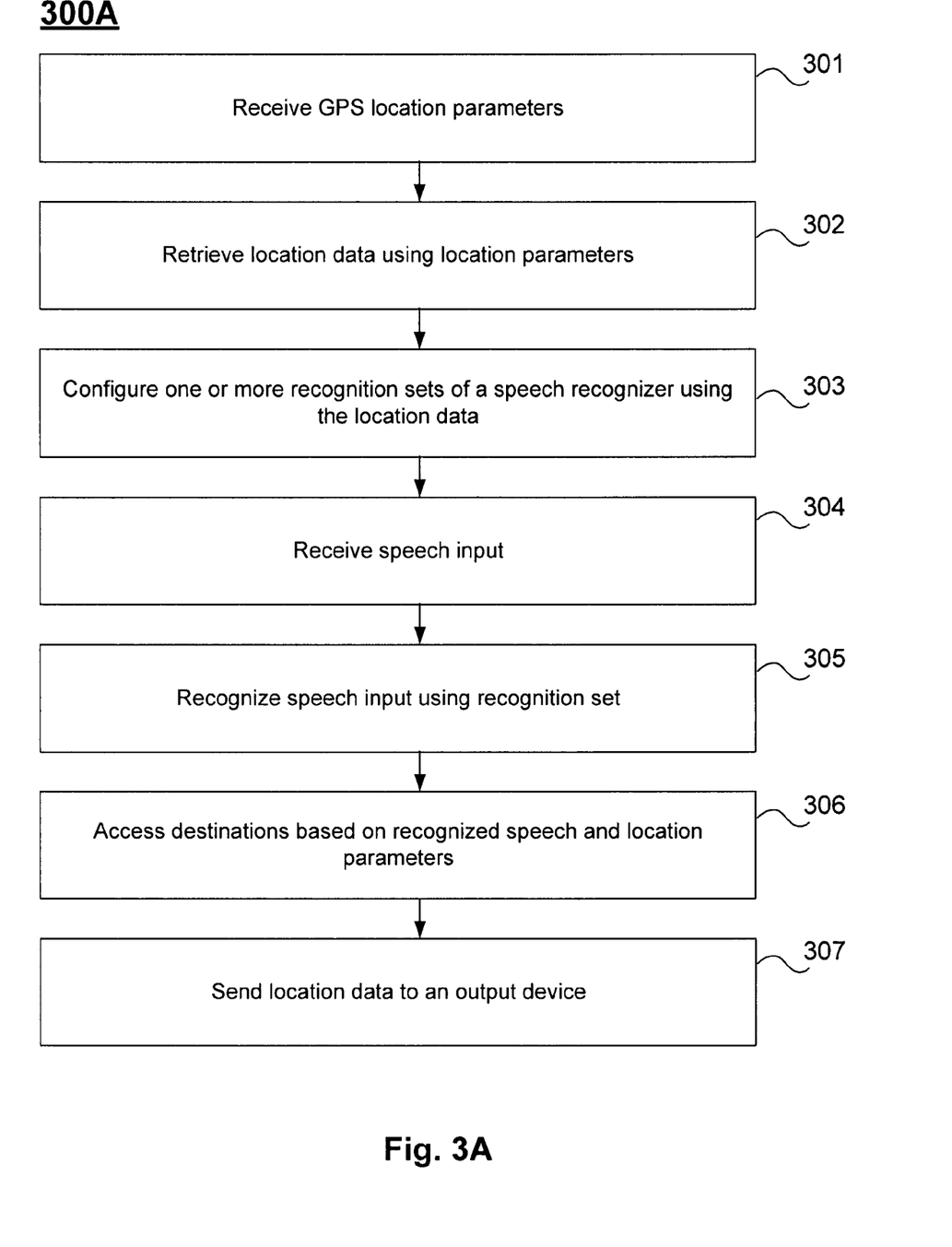
FIG. 3A illustrates another method for performing speech recognition using location information according to one embodiment of the present invention.

FIG. 3A illustrates another method for performing speech recognition using location information according to one embodiment of the present invention. At 301, the system receives GPS location parameters. As mentioned above, these parameters may include position, speed, direction, and altitude. Next at 302, location data is retrieved using the location parameters. As mentioned above, the location parameters and the GPS settings may dictate the scope of location data retrieved according to the distance surrounding the location. The scope of the content may also be limited as mentioned above. Also as mentioned above, the location data can be on a wide variety of media. At 303, the recognition sets of the speech recognizer are configured using the location data. The name of a street, city, restaurant, or class (e.g., gas stations, restaurants, store types, etc. . . . ) are examples of location data. In one embodiment, the speech recognizer may be reconfigured or updated based on scale and location change. For example, if the scale is small, a small change in location may trigger an update of the recognition set more frequently. At 304, speech input is received. As mentioned above, the speech may be inputted via a microphone, amplifier, and an ADC in order to translate the audio message into a digital format. At 305 the speech input is recognized using the one or more recognition sets. At 306, one or more destinations are accessed based on the recognized speech and location parameters. For example, if the recognized utterance is "gas station", then the system may access location data corresponding to gas station destinations. As another example, if the recognized utterance is "Joe's Restaurant", then the system may access location data corresponding to the specific location of "Joe's Restaurant," if such information is available. Accessing destinations may further be limited based on location parameters. For example, if the speed of a car is 5 miles per hour, the system may automatically limit the location data to destinations within 1 mile, for example. Alternatively, if the speed of a car is 60 miles per hour, the system may automatically retrieve location data for destinations (e.g., gas stations) within 20 miles. A variety of location parameters may be used to access location data together with recognition results. As another example, if the system determines that car is traveling on a particular road in a particular direction, the system may return destinations that are ahead of the car, rather than destinations that are, for example, 5 miles behind the car. At 307, the location data may be sent to an output device. As mentioned above, the location data may include location parameters and other information for one or more destinations, which may be used by a guidance system to provide audio or video feedback, or both, to a user to direct the user to the desired destination (e.g., using a speaker or display).

Figure 3B:
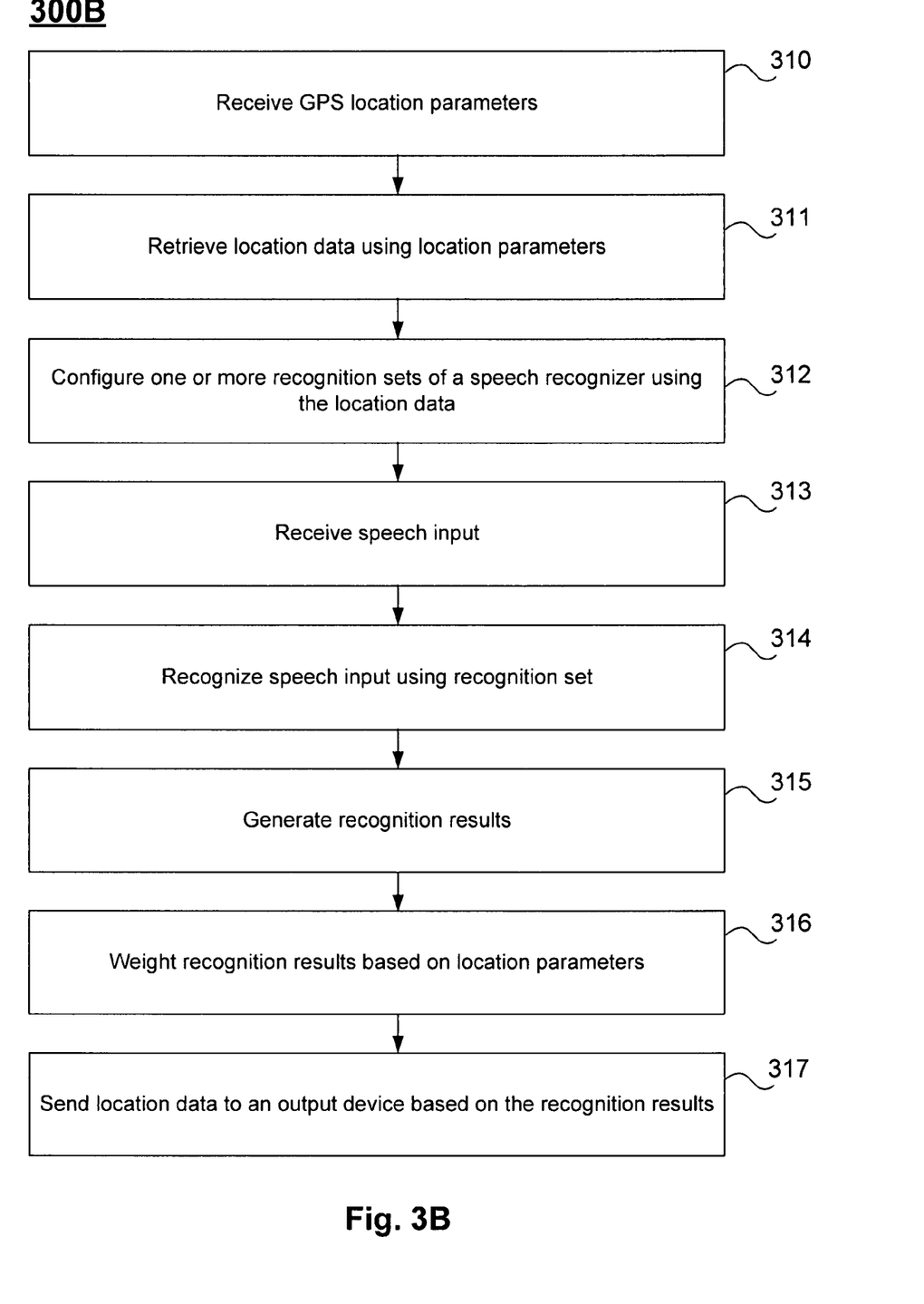
FIG. 3B illustrates another method for performing speech recognition using location information according to one embodiment of the present invention.

FIG. 3B illustrates another method for performing speech recognition using location information according to one embodiment of the present invention. The process in this example may proceed from 310-314 in the same manner as in FIG. 3A 301-305. However, in this example, the recognition results may be processed using the location parameters. For instance, at 315, a recognizer may generate recognition results with corresponding likelihoods. The recognition results may include multiple possible results with associated likelihoods based on an input utterance. For example, the user may say "find Martin Avenue", and the recognition results may be as follows:
{Marvin Avenue, 455}
{Martin Avenue, 320}
{Melvin Avenue, 123}

These possible destinations may each be included as words in the recognition set. The recognizer may receive input speech (an utterance) and generate likelihoods associated with each word in the word set. The words above may have the highest 3 likelihoods, for example. At 307, the destinations are weighted based on location parameters. In one embodiment, the proximity of the destination may be used to weight the recognition results, and the weighting may be used determine the user's desired destination. For example, if Martin Avenue is much closer than Marvin Avenue and Melvin Avenue, or in the direction the user is traveling, for example, the weighting for the "Martin Avenue" result may be weighted more than the others. In one embodiment the weighting may be accomplished by multiplying by a weighting factor. For example, the likelihoods (initial score) above may be multiplied by factors which take into account position, direction, or other location parameters, which may result in an adjusted likelihood. In the previous example, the "Martin Avenue" initial likelihood may be multiplied by a factor of two while the other entries are simply multiplied by one. This style of weighting would result in new weighted destinations as follows.
{Marvin Avenue, 455}
{Martin Avenue, 640}
{Melvin Avenue, 123}
This may result in Martin Avenue being selected as the final recognition result. At 308, location data is sent to the output device based on the final recognition result as described above.

In one embodiment the highest score may be communicated as the GPS's best guess to what the user would consider his desired destination. In an alternated embodiment, the top weighted destinations may be communicated to the user allowing him to make the final decision. For example, the GPS device may output "Is Martin Avenue your desired destination?", and if the user says "no", the GPS device may output "Is Marvin Avenue your desired destination?". The outputting of multiple destinations to choose from may be based on how close the final destination scores are to one another. It is to be understood that any location parameters may be used to weight the possible destinations according to a variety of algorithms.

In another embodiment, the location can be used to help perform speech recognition. For example, a user is traveling and is in the proximity of Oakland International Airport and says "Duncan Donuts in Oakland" and the following ranked list results;
1) Duncan Donas in Auckland
2) Duncan Donuts in Auckland
3) Duncan Donas in Oakland
4) Duncan Donuts in Oakland
Furthermore, the system may do a telephone book search and disqualify entry 1 and 3 because there is no "Duncan Donas" in Oakland or Auckland. The GPS system may weight the results according to proximity and result in the following ranking due to the weighting of the previous list;
1) Duncan Donuts in Oakland
2) Duncan Donuts in Auckland
That may result in entry 1 being chosen as the best guess of location.

In another embodiment, the location, speed, and direction can be used to help perform speech recognition. For example, a user is traveling as in the example above in the proximity of Oakland but is aboard a supersonic jet traveling toward Australia. In this embodiment, the "Duncan Donuts in Auckland" may be ranked first due to the weighting of the speed and direction.

Figure 4:
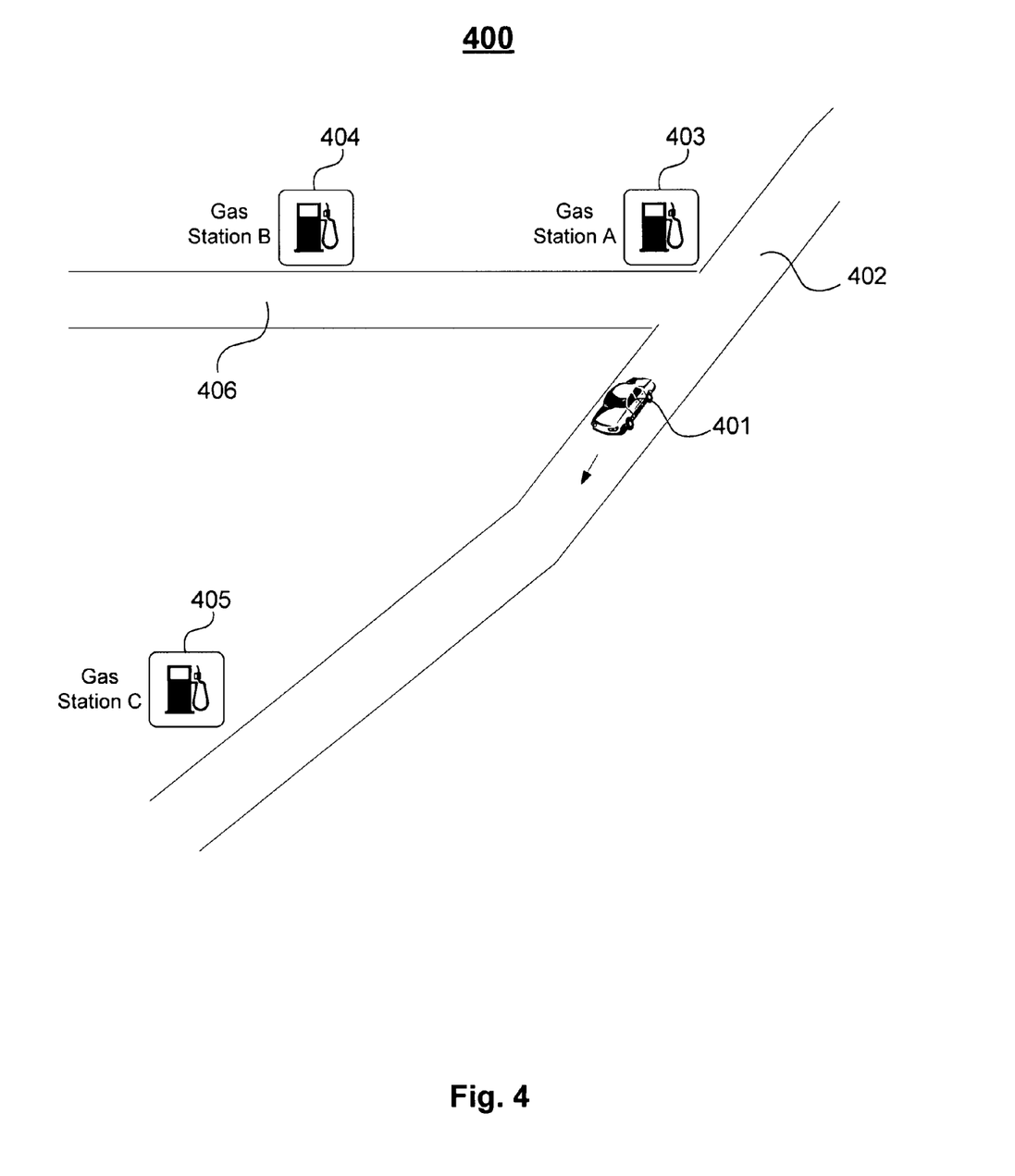
FIG. 4 illustrates an example of how position and direction information may be used for performing speech recognition according to another embodiment of the present invention.

FIG. 4 illustrates an example of how position and direction information may be used for performing speech recognition according to another embodiment of the present invention. In this example, one or more destinations accessed based on the recognition results and location data. Scenario 400 includes a user 401 equipped with one embodiment of the present invention, a street 402, a side street 406, gas station A 403, gas station B 404, and gas station C 405. The user 401 could be a pedestrian with a PDA (Personal Digital Assistant) equipped with this embodiment of the present invention, a bicycle rider with a bicycle equipped with this embodiment of the invention, or a driver of a car equipped with this embodiment of the invention. User 401 is moving down street 402 in his car and travels passed a side street 406. In this embodiment, the recognition set is periodically updated and ready to respond to the driver's requests. For example, the recognition set has been updated to include gas stations A-C (403-405). As the user 401 drives down the street further he realizes he needs to refuel his gas tank and utters "find gas station". The audio user interface translates the utterances into a digital signal and the utterances are recognized as a request to find a convenient gas station. All gas stations within a predetermined area are accessed based on the direction of movement and position. Since the user has passed street 406, the system may only access gas station C.

Figure 5A:
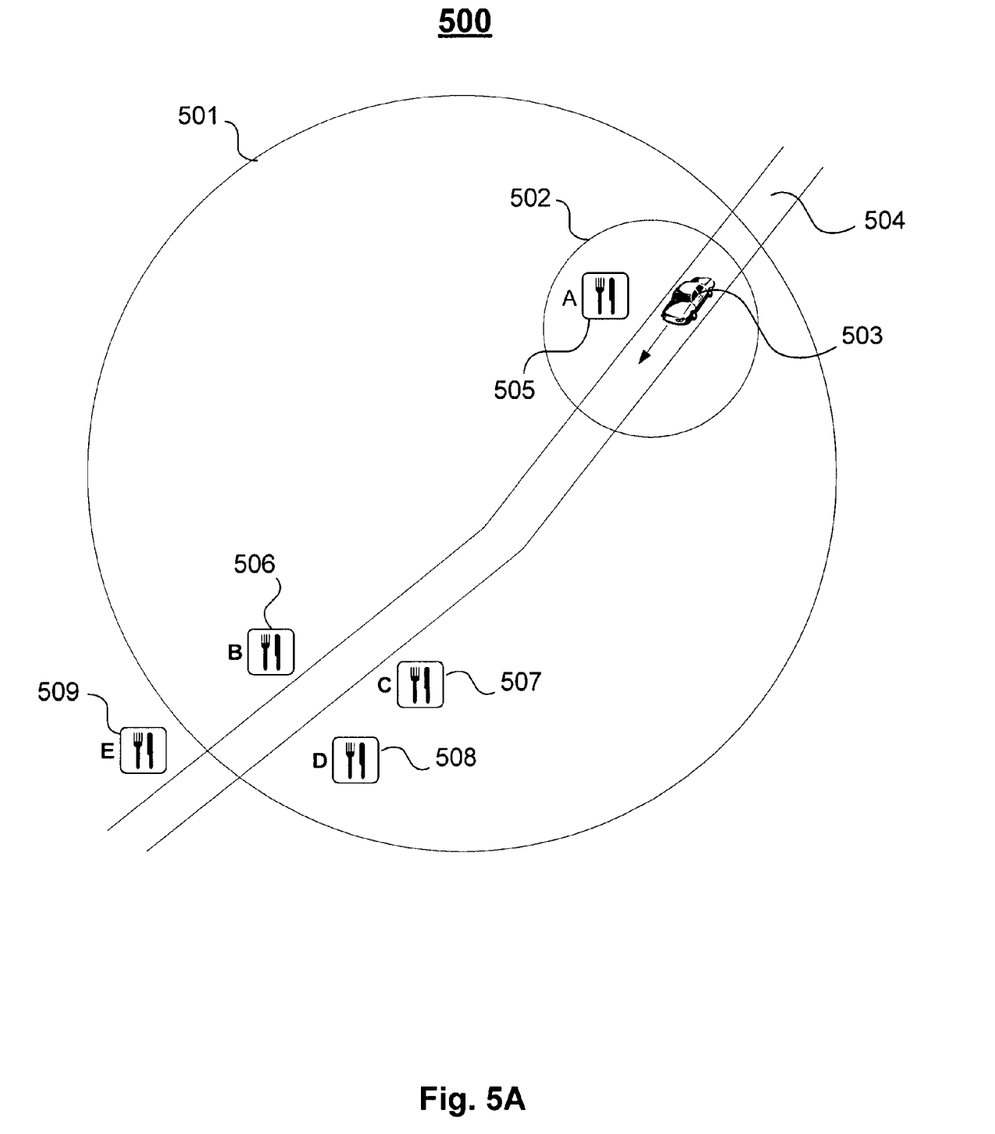
FIG. 5A illustrates an example of how position, direction, and speed information may be used for performing speech recognition according to another embodiment of the present invention.

FIG. 5A illustrates an example of how position, direction, and speed information may be used for performing speech recognition according to another embodiment of the present invention. Scenario 500 includes a user 503 equipped with one embodiment of the present invention, a highway 504, a medium speed content area 502, a high speed content area 501, a restaurant A 505, a restaurant B 506, a restaurant C 507, a restaurant D 508, and a restaurant E 509. The user 503 could be a commuter with a PDA (Personal Digital Assistant) equipped with this embodiment of the present invention, a motorcycle rider with a helmet equipped with this embodiment of the invention, or a driver in a car equipped with this embodiment of the invention. User 503 is moving down highway 504 in his car and is traveling 75 miles per hour. In this embodiment, the recognition set is periodically updated and ready to respond to the driver's requests. This updating may be done based on the change of position, time, or speed, for example. In one embodiment, speed is used to change the content area which is used when considering the relevant area for location data. Speed content area 502 is used when the user is moving 35 mph and restaurant A is the only restaurant within this content area. Since the user is now moving 75 mph on the highway his content area grows to area 501 which incorporates restaurants A-D. Restaurant E is beyond the perimeter of the high speed content area.

Figure 5B:
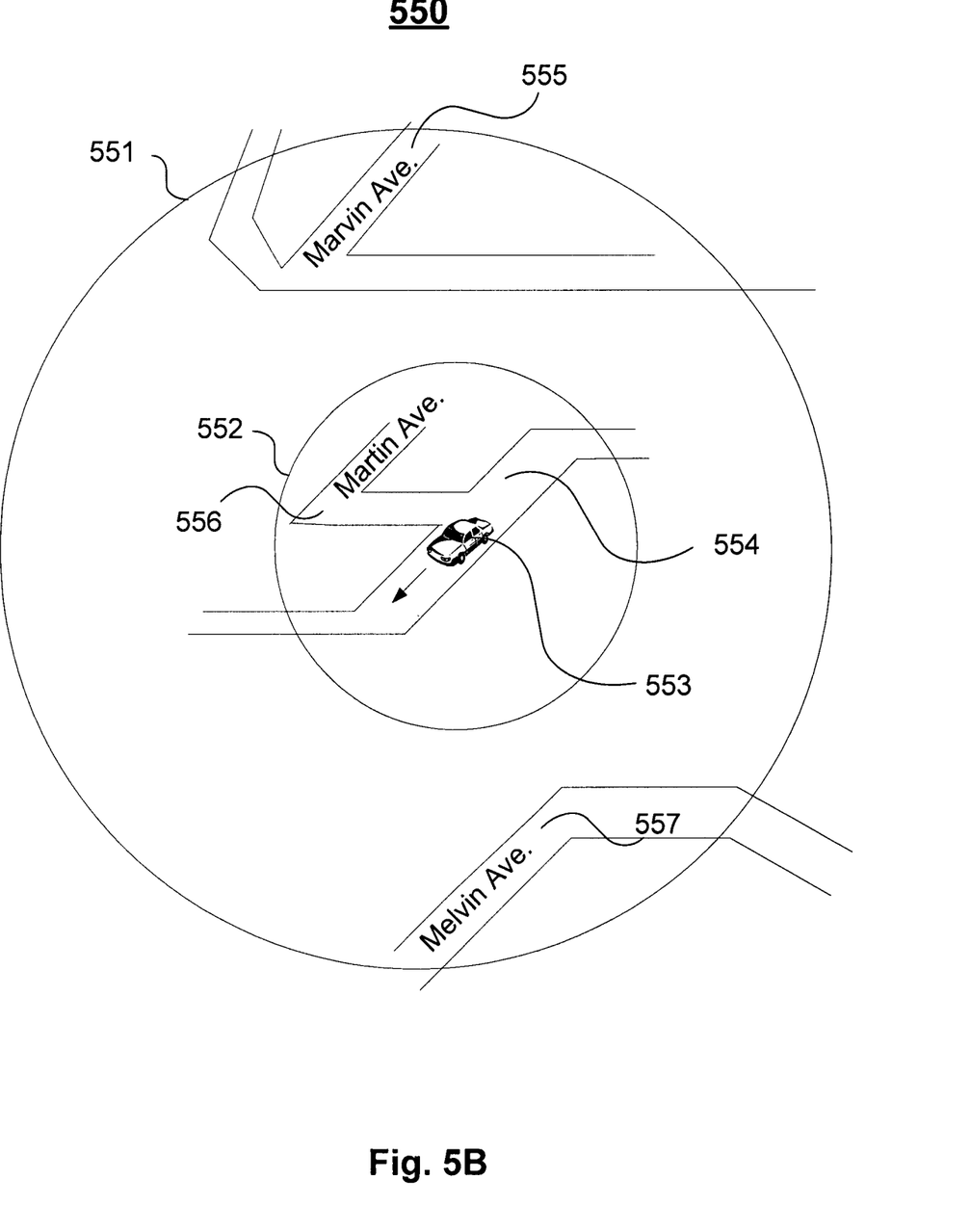
FIG. 5B illustrates another example of how speed information may be used for performing speech recognition according to another embodiment of the present invention.

FIG. 5B illustrates an example of how speed information may be used for performing speech recognition according to another embodiment of the present invention. Scenario 550 includes a user 553 equipped with one embodiment of the present invention, a neighborhood street 556, a neighborhood street 554, a medium speed content area 551, a low speed content area 552, a street in the region 555, and another street in the region 557. The user 553 could be a pedestrian with a PDA (Personal Digital Assistant) equipped with this embodiment of the present invention, a bicycle rider with a bicycle equipped with this embodiment of the invention, or a driver of a vehicle equipped with this embodiment of the invention. User 553 is moving down a residential street 554 in his car and is traveling 25 miles per hour. In this embodiment, the recognition set is periodically updated and ready to respond to the driver's requests. This updating may be done based on the change of position, time, or speed, for example. In another embodiment, speed is used to change the content area which is used when considering the relevant area for location data. Speed content area 551 is used when the user is moving 45 mph and many streets are included in area 551. Neighborhood street 556, neighborhood street 554, regional street 555, and regional street 557 are all contained within area 551. Since the user is now moving 25 mph on this neighborhood street his content area shrinks to area 552 which incorporates only the streets in the local neighborhood. Neighborhood street 556 and neighborhood street 554 are both contained within area 552. Also, since the user is traveling at a reduced speed, the content area may include a more complimentary area behind (not in the direction of travel) the user. This may be done because it is much easier to turn around in a residential area and the lower speed implies that the destination may be very close in proximity. With the content area reduced to area 552 due to a speed of 25 mph, the user suddenly wants some help finding a street in the local neighborhood and says "find Martin Avenue". Since the content area is more restricted, regional streets Marvin Avenue 555 and Melvin Avenue 557 will not be included in the recognition set and this way make the recognition of Martin Avenue 556 more straightforward.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method comprising:
   receiving, by an electronic device, location parameters from a global positioning system, the location parameters comprising a first position of the electronic device and a speed of the electronic device;
   retrieving, by the electronic device, location data pertaining to a content area, wherein the content area is centered at the first position of the electronic device, and wherein a scale of the content area is dependent on the speed of the electronic device;
   configuring, by the electronic device, one or more speech recognition sets using the location data;
   determining, by the electronic device, that the electronic device has moved to a second position that is geographically distant from the first position beyond a threshold, the threshold being dependent on the scale of the content area;
   retrieving, by the electronic device, new location data pertaining to a new content area centered at the second position of the electronic device; and
   automatically reconfiguring, by the electronic device, the one or more speech recognition sets using the new location data.

2. The method of claim 1 wherein the scale of the content area increases as the speed of the electronic device increases, and wherein the scale of the content area decreases as the speed of the electronic device decreases.

3. The method of claim 2 wherein the one or more speech recognition sets are reconfigured if the speed of the electronic device changes a predetermined amount.

4. The method of claim 1 further comprising:
receiving a speech input signal;
processing the speech input signal using the one or more speech recognition sets; and
generating, based on the processing, a speech recognition result.

5. The method of claim 4 further comprising determining one or more destinations based on the recognition result and the location data.

6. The method of claim 1 further comprising accessing one or more destinations based on the recognition result, the location data, and the location parameters.

7. The method of claim 1 further comprising:
receiving a speech input signal;
processing the speech input signal using the one or more speech recognition sets;
generating, based on the processing, a plurality of recognition results; and
weighting said recognition results based on said location parameters.

8. The method of claim 4 further comprising activating a guidance program in response to generating the speech recognition result and outputting guidance information.

9. The method of claim 1 wherein the location data comprises a plurality of names of restaurants determined based on the content area, and wherein the names of the restaurants are configured in the one or more speech recognition sets.

10. The method of claim 1 wherein the location data comprises a plurality of names of gas stations determined based on the content area, and wherein the names of the gas stations are configured in the one or more speech recognition sets.

11. The method of claim 1 wherein the location data comprises a plurality of street names determined based on the content area, and wherein the street names are configured in the one or more speech recognition sets.

12. The method of claim 1 wherein the location data comprises a plurality of names determined based on the content area, and wherein the names are configured in the one or more speech recognition sets.

13. A method comprising:
determining, by an electronic device, location parameters for the electronic device using a global positioning system (GPS) receiver, the location parameters including a position, a speed, and a direction of the electronic device;
retrieving, by the electronic device, location data pertaining to a content area, wherein the content area is centered at the position of the electronic device, and wherein a scale of the content area is dependent on the speed of the electronic device;
receiving, by the electronic device, a speech input signal corresponding to speech uttered by a user of the electronic device, the speech being relevant to determining a desired destination;
configuring, by the electronic device, one or more speech recognition sets using the location data;
determining, by the electronic device, a plurality of candidate destinations as a result of processing of the speech input signal using the configured one or more speech recognition sets;
weighing, by the electronic device, each of the plurality of candidate destinations based on one or more of the location parameters, wherein weighing each of the plurality of candidate destinations based on one or more of the location parameters comprises weighing each of the plurality of candidate destinations based on the direction of the electronic device, such that a first candidate destination that is located in the direction the electronic device is heading is weighed more heavily that a second candidate destination that is not located in the direction the electronic device is heading; and
outputting, by the electronic device to the user, a destination in the plurality of candidate destinations having the highest weight.

14. The method of claim 13 wherein weighing each of the plurality of candidate destinations based on one or more of the location parameters further comprises weighing each of the plurality of candidate destinations based on the position of the electronic device, such that a first candidate destination that is closer to the position of the electronic device than a second candidate destination is weighed more heavily than the second candidate destination.

15. An electronic device comprising:
a controller configured to:
receive location parameters from a global positioning system, the location parameters comprising a first position of the electronic device and a speed of the electronic device;
retrieve location data pertaining to a content area, wherein the content area is centered at the first position of the electronic device, and wherein a scale of the content area is dependent on the speed of the electronic device;
configure one or more speech recognition sets using the location data;
determine that the electronic device has moved to a second position that is geographically distant from the first position beyond a threshold, the threshold being dependent on the scale of the content area;
retrieve new location data pertaining to a new content area centered at the second position of the electronic device; and
automatically reconfigure the one or more speech recognition sets using the new location data.

* * * * *